United States Patent [19]

Muchow

[11] 4,386,756

[45] Jun. 7, 1983

[54] SELF CENTERING FLOATING METAL SEAL FOR A BALL VALVE

[75] Inventor: John D. Muchow, Long Beach, Calif.

[73] Assignee: Valve Concepts International, Carson, Calif.

[21] Appl. No.: 222,738

[22] Filed: Jan. 5, 1981

Related U.S. Application Data

[63] Continuation of Ser. No. 134,660, Mar. 27, 1980, abandoned, which is a continuation of Ser. No. 16,354, Mar. 1, 1979, abandoned.

[51] Int. Cl.³ ............................................. F16K 35/00
[52] U.S. Cl. .................................. 251/172; 251/174; 251/315; 251/316
[58] Field of Search ............... 251/315, 316, 359, 172, 251/174

[56] References Cited

U.S. PATENT DOCUMENTS

| | | | |
|---|---|---|---|
| 3,154,094 | 10/1964 | Bredtschneider | 251/315 X |
| 3,164,362 | 1/1965 | Lavigueur | 251/315 X |
| 3,508,736 | 4/1970 | Rhodes | 251/172 |
| 3,732,885 | 5/1973 | Allen | 251/315 X |
| 4,099,705 | 7/1978 | Runyan | 251/172 X |

Primary Examiner—Harold W. Weakley
Attorney, Agent, or Firm—Dodge & Bush

[57] ABSTRACT

The invention is an improved self-centering, floating metal seal to be used in combination with a ball valve which controls the flow of fluid in a conduit. The ball valve includes a valve body which has a bore extending therethrough and which also has an inlet and an outlet which are axially aligned and adapted to be mechanically coupled to the conduit. The valve body also has an aperture therein. The ball valve also includes a spherical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the aperture of the valve body and the stem. The improved self-centering, floating metal seal includes a metal ring which has a planar surface and a contoured surface which is adapted to contact the spherical surface of the valve member and which is axially aligned with the bore of the valve body and is disposed adjacent to the spherical valve member. The seal also includes a metal piston which has a first planar surface which is disposed adjacent to the planar surface of the metal ring and a second planar surface. There is a difference in the dynamic sealing areas of the piston and metal ring so that the upstream pressure mechanically seals the ball valve.

3 Claims, 4 Drawing Figures

SELF CENTERING FLOATING METAL SEAL FOR A BALL VALVE

This application is a continuation of application Ser. No. 134,660, filed Mar. 27, 1980 which is a continuation of Ser. No. 016,354, filed Mar. 1, 1979 both abandoned.

BACKGROUND OF THE INVENTION

1. Field of the Invention

The present invention relates to a trunnion-mounted ball valve and more particularly to a trunnion-mounted ball valve which has a pair of self-centering, floating metal seals.

2. Description of the Prior Art

U.S. Pat. No. 3,269,692, entitled Ball Valve Construction, issued to Homer J. Shafer on Aug. 30, 1966 teaches an improvement for use in a trunnion-mounted ball valve having a housing forming a cavity laterally around the ball and flow tubes longitudinally of the valve, seating rings adjustable longitudinally between the ball and the flow tubes, and resilient seals between the seating rings and the ball. The improvement includes a device for utilizing the cavity pressure to force the seating ring on the downstream side of the ball to seal against the ball radially outwardly of the resilient seal. The device is a seating ring construction having a greater area exposed to cavity pressure acting toward the ball than its area exposed to cavity pressure acting away from the ball.

U.S. Pat. No. 3,269,691, entitled Ball Valve Seal Support, issued to Robert J. Meima and James D. Aiken on Aug. 30, 1966 teaches an improvement for a valve which includes a casing having a central bore terminating in shoulders defining axially outer reduced bores which terminate in shoulders defining inlet and outlet ports communicating with the bores; a ball including a flow passage rotatably mounted in the central bore and valve seats slidably and rotatably mounted in the reduced bores and having enlarged portions terminating in shoulders. The valve also includes a ball engaging valve seal slidably mounted on each of the portions. The valve seats and the portions containing the seals are movable from an operative ball engaging position to a ball clearance position against the bore and port defining shoulders. There is a cam slot formed in the outer periphery of the seats. There are pins fixed to the casing and projecting into the slots to effect axial movement of the seats between the positions upon rotation of the seats. A spring acts between the enlarged portion shoulders and the seals to urge the seals against the ball in operative position. The valve casing includes a removable cover for the insertion of the ball, a recess formed in the outer peripheries of the valve seats, and retaining pins projecting from the cover and into the recesses to limit the movement of the valve seats toward the ball to limit the pressure of the seals against the ball and retain the valve seats in operative position.

U.S. Pat. No. 3,226,080, entitled Ball Valve Seat, issued to William E. Lowry on Dec. 28, 1965, teaches a rotatable plug valve that includes a valve body that has a bore extending therethrough, a spherical valve member that is positioned in the bore and that has a port the axis of which is alignable with the axis of the bore in the open position of the valve and an aperture in the valve body. The rotatable plug valve also includes a stem that has an inner end which is engaged with the valve member and an axially outer end which extends through the aperture in the valve body and a device for forming a seal between the aperture and the stem. The rotatable plug valve further includes detachably connected end members which extend into each end of the bore in the valve body with each end member having a device which limits entry of the end member into the valve body a predetermined amount and with each end member also having a passage with which the port in the valve member can be aligned to form the run of the valve and an axially inner end having a portion taperingly diverging axially outward from the passage. The rotatable plug valve still further includes an annular groove in the taperingly diverging portion of the axial inner end with each annular groove having an inner and outer cylindrical walls which are disposed in coaxial relation with the respective passage and also having an end wall which is disposed in substantially normal relation with the cylindrical walls. There is also an annular seat member of deformable material which is positioned in each of the grooves with each seat member being of lesser radial thickness than the radial thickness of its groove so that in the uncompressed condition there is substantial clearance between the seat member and groove along the entire length of both the inner and outer circumferences of the groove. Each seat member has a portion which extends beyond the surface of the taperingly diverging portion terminating in a tapered surface to oppose the spherical surface of the valve member with each end member extending into the body bore an amount sufficient to force the seat member into intimate sealing contact with the spherical surface of the valve member upon assembly thereby deforming the seat member a limited amount so that the seat members do not completely fill the groove either during assembly or operation within rated pressure whereby the seat members act as a columnar spring against the spherical valve member.

Other ball valves are taught in U.S. Pat. No. 3,269,693, entitled Ball Valve Seat, issued to Ronald A. Gullick on Aug. 30, 1966, and U.S. Pat. No. 3,357,679, entitled Multi-Material Elastomer Seal, issued to Robert A. Gullick on Dec. 12, 1967.

In all of the trunnion-mounted ball valves of the prior art the sealing rings are separated from the ball by a resilient, deformable seal in order to correct for any misalignment of the sealing ring and the ball. If there is not a resilient, deformable ring placed between the sealing ring and the ball, the ball valve will not seal properly. However, scale becomes deposited on the surface of the ball and acts as an abrasive thereby filing down the surface of the resilient deformable seal to a point where it can no longer seal the ball valve. At that time the ball valve must either be replaced or repaired.

The inventor has considered eliminating the resilient, deformable seal between the sealing ring and the ball. The difficulty with eliminating the resilient, deformable seal is that the ball valve will leak unless the sealing ring is in perfect contact with the ball. It is impossible to realize perfect contact between the ball and the sealing rings as long as the sealing ring can only move along the axis of the bore of the valve body.

SUMMARY OF THE INVENTION

In view of the foregoing factors and conditions characteristic of the prior art is is the primary object of the present invention to provide a ball valve that has a self-centering, floating metal seal.

It is another object of the present invention to provide metal sealing ring which cleans the scale off the surface of the ball in a ball valve.

In accordance with the preferred embodiment of the present invention an improved self-centering, floating metal seal to be used in combination with a ball valve which controls the flow of fluid in a conduit is described. The ball valve includes a valve body which has a bore extending therethrough and which also has an inlet and an outlet which are axially aligned and adapted to be mechanically coupled to the conduit. The valve body also has an aperture therein. The ball valve also includes a spherical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the aperture of the valve body and the stem. The improved self-centering, floating metal seal includes a metal ring which has a planar surface and a contoured surface which is adapted to contact the spherical surface of the valve member and which is axially aligned with the bore of the valve body and is disposed adjacent to the spherical valve member. The seal also includes a metal piston which has a first planar surface which is disposed adjacent to the planar surface of the metal ring and a second planar surface. There is a difference in the dynamic sealing areas of the piston and metal ring so that the upstream pressure mechanically seals the ball valve.

The features of the present invention which are believed to be novel are set forth with particularity in the appended claims.

Other objects and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
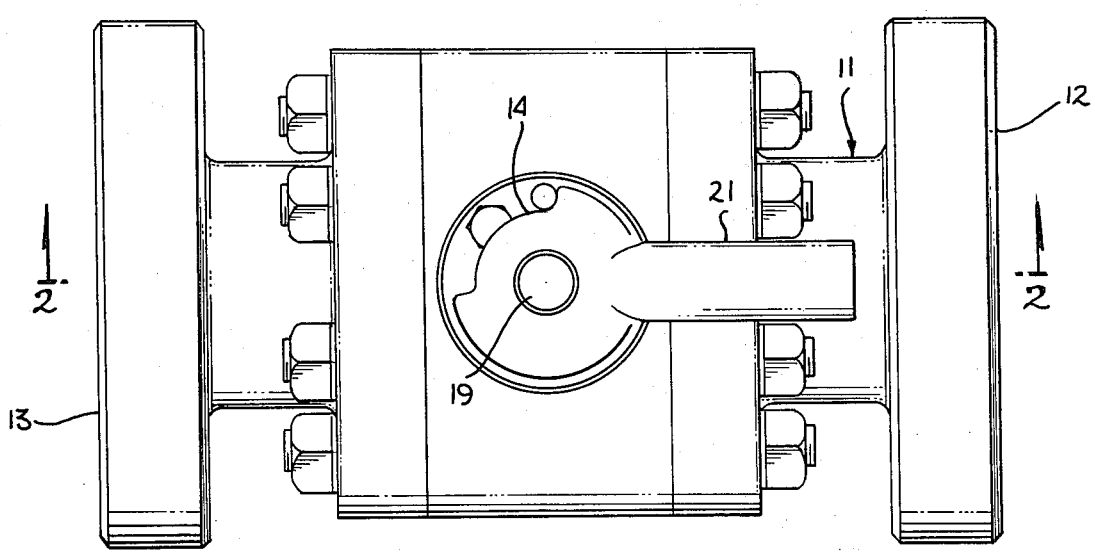
FIG. 1 is a plan view of a ball valve which has a self-centering, floating metal seal in accordance with the principles of the present invention.

The present invention can best be understood by reference to a detailed description of its preferred embodiment and reference to the accompanying drawing thereof. FIG. 1 is a plan view of a ball valve that is basically similar to the ball valve taught in U.S. Pat. No. 3,226,080 in that the ball valve includes a valve body 11 having an inlet 12 and an outlet 13 which are axially aligned and which are adapted to be mechanically coupled to a conduit. The valve body 11 also has an aperture 14 therethrough.

Figure 2:
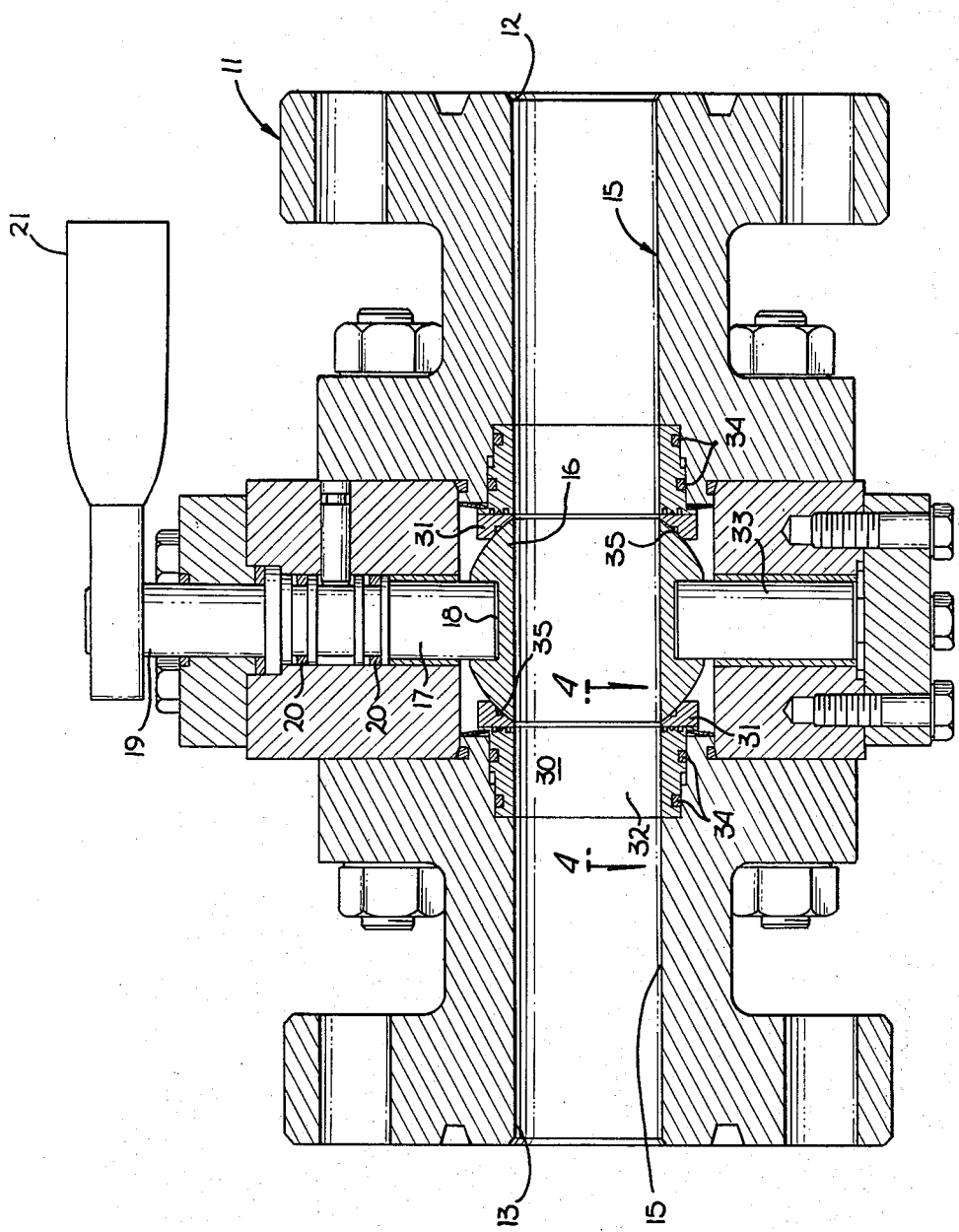
FIG. 2 is a cross-sectional, transverse view of the ball valve of FIG. 1, taken along line 2—2 of FIG. 1 in the open position.

Referring now to FIG. 2 a cross-sectional transverse view shows that the ball valve also includes a bore 15 extending through the valve body 11, a spherical valve member 16 having a port, the axis of which is alignable with the axis of the bore 15 of the valve body 11 and a stem 17 which has an inner end 18 mechanically coupled to the spherical valve member 16 and an axially outer end 19 which extends through the aperture 14 of the valve body 11.

Referring still to FIG. 2 the ball valve further includes a pair of resilient seals 20 which seal the stem 17 within the aperture 14 and a handle 21 which is mechanically coupled to the axially outer end 19 of the stem 17. The ball valve still further includes an improved self-centering, floating metal seal 30 which includes a metal ring 31 having a planar surface and a contoured surface which is adapted to contact the spherical surface of the spherical valve member 16 and a metal piston 32 which has a first planar surface which is disposed adjacent to the planar surface of the metal ring 31 and a second planar surface.

The spherical member 16 has a port, the axis of which is alignable with the axis of the bore 15 of the valve body 11 and it is mounted on a trunnion 33. The bore 15 of the valve body 11 extends therethrough in axial alignment with the inlet 12 and the outlet 13 thereof.

The self-centering, floating metal seal 30 also includes a pair of resilient sealing devices 34 for forming a seal between the aperture 14 and the bore 15 of the valve body 11. The metal piston 32 has a difference in its dynamic sealing areas such that the upstream pressure mechanically sets the ball valve. In alternative embodiment, the downstream pressure may mechanically seal the ball valve in that a piston moves in a direction toward larger dynamic sealing area.

Figure 3:
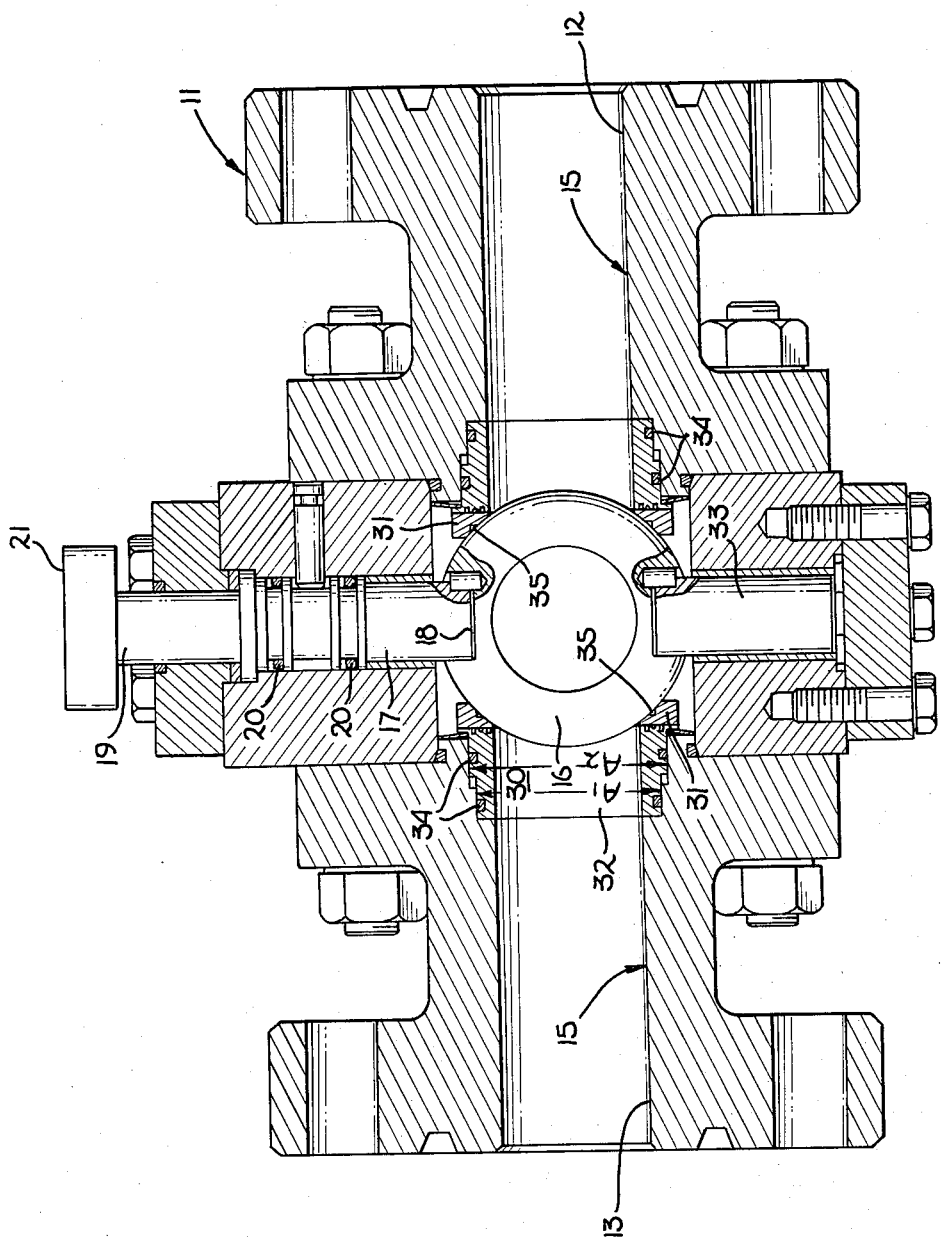
FIG. 3 is a cross-sectional, transverse view of the ball valve of FIG. 1 in the closed position.

Referring now to FIG. 3 the ball valve is shown in the closed position the upstream pressure acts on the dynamic sealing areas $A_1$ and $A_2$ of the metal piston 32 which are designated in this figure. The difference in these two dynamic sealing areas is defined by the equation $AA = A_2 - A_1$. The metal piston 32 reacts in the direction of net difference thereof driving the metal ring 31 into the spherical valve member 16. The metal ring 31 contacts the spherical surface of the spherical valve member 16 directly. The metal ring 31 is not only able to align itself on the spherical valve member 16, but is also able to scrape off scale and other abrasive deposits that accumulate on the spherical valve member 16 without itself being filed away. This increases the useful service life of the ball valve.

The metal ring 31 is able to align itself on the spherical valve member 16 because it is not mechanically coupled to the metal piston 32 thereby allowing it to move on the spherical surface of the spherical valve member 16 until it contacts the spherical surface thereof completely along its sealing periphery. The self-centering, floating metal seal 30 further includes a resilient seal 35 between the metal ring 31 and the metal piston 32.

Figure 4:
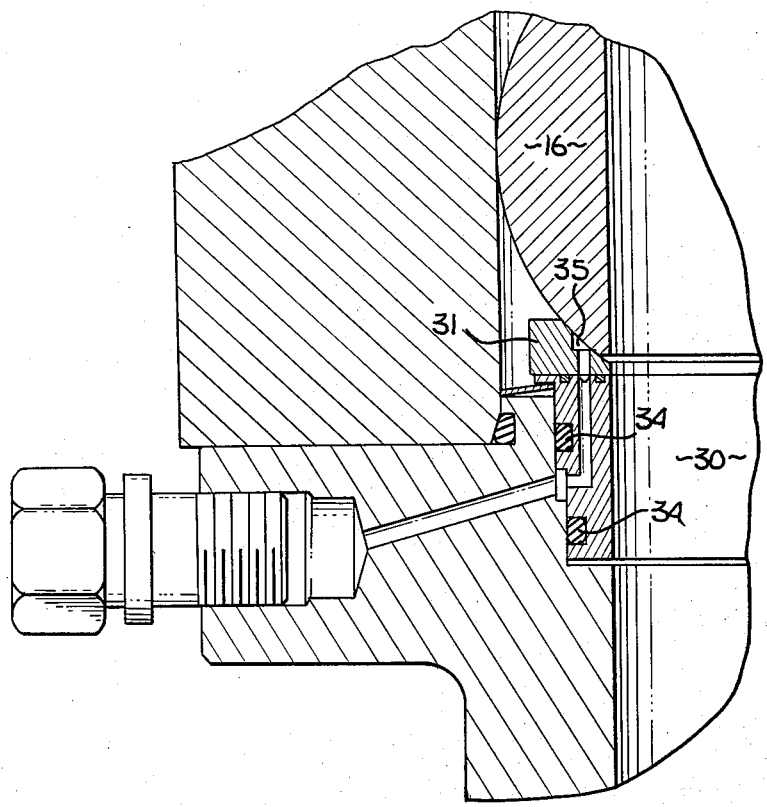
FIG. 4 is a partial, cross-sectional view of the ball valve of FIG. 1 which shows a portion of the ball valve member and the floating metal seal of the ball valve taken along line 4—4 of FIG. 2.

Referring now to FIG. 4 a self-centering, floating metal seal 30 is shown in an enlarged, partial cross-sectional view.

From the foregoing it can be seen that an improved self-centering, floating metal seal for use in combination with a ball valve has been described. The metal seal not only is self-centering because it is not rigidly coupled to the metal piston through which the upstream pressure acts thereon, but also resists erosion which occurs to the other self-centering seals which rely on a resilient, deformable seal in order to overcome misalignment of the spherical valve member and the self-centering seal.

It should be noted that the schematics of the improved self-centering, floating metal seal are not drawn to scale and that the distances of and between the figures are not to be considered significant.

Accordingly, it is intended that the foregoing disclosure and showings made in the drawing shall be considered only as an illustration of the principles of the present invention.

What is claimed is:

1. A ball valve apparatus having an improved self-centering, floating metal seal means used in combination with a trunnion mounted ball flow closure element which controls the flow of fluid in a conduit and which includes:
    a fluid containing valve body having a bore extending therethrough for forming a flow passage extending therethrough, said valve body having an inlet and an outlet which are axially aligned and adapted to be mechanically secured in a flow controlling relationship to the flow conduit and said valve body also having an aperture formed therein;
    a spherical valve member having a flow enabling port, the axis of said flow enabling port alignable with the longitudinal axis of the bore of said valve body to provide a substantially unrestricted flow path, said spherical valve member enabling flow through said bore when said port rotatably positioned out of flow communication with said bore;
    a valve operating stem having an inner end mechanically coupled to said spherical valve member for effecting operating rotation of said valve member and an outer end which extends in a sealed relationship through the aperture of said valve body;
    means operably secured with said spherical valve and cooperating with said valve operating stem to form trunnions for rotatably mounting said valve member with said stem while blocking movement of said valve member along the longitudinal axis of said bore; and
    sealing means for forming a self-centering seal between said valve body and said valve member, said sealing means comprising:
        a metal seat ring having a planar annular surface and a spherical contoured surface disposed in sealing contact with said spherical valve member, said metal seat ring forming an axis positioned concentrically on said longitudinal axis of the bore of said valve body and disposed for radial eccentric movement relative to said axis of the bore; and
        a piston sleeve having a first planar annular surface disposed in sealing contact with said planar annular surface of said metal seat ring, said piston sleeve having means for urging said piston sleeve toward said spherical valve member along said longitudinal axis of said valve body, said seat ring radially slidable relative to said piston sleeve on said contacting planar sealing surface to enable natural centering movement of said seat ring in effecting sealing contact with said spherical valve member by moving radially eccentrically relative to said longitudinal axis.

2. The ball valve apparatus as set forth in claim 1, including:
    means for sealing said piston sleeve and said valve body disposed relative to the fluid seal of said seat ring and said spherical valve member for urging said piston sleeve and said seat ring toward said spherical valve member in response to fluid pressure in said bore adjacent said inlet.

3. The ball valve apparatus as set forth in claim 1, wherein:
    said sealing means further comprising a second metal seat ring and a second fluid pressure responsive piston sleeve movably disposed in said bore diametrically opposite said first seat ring, said second metal seat ring having a planar annular surface and a spherical contoured surface disposed in sealing contact with said spherical valve member, said second piston sleeve having a planar annular surface disposed in sealing contact with said planar annular surface of said second metal seat ring, said second piston sleeve having means for urging said second piston sleeve toward said spherical valve member along said longitudinal axis, said second seat ring radially slidable relative to said second piston sleeve on said contacting planar surfaces to enable centering of said second seat ring in sealing contact with said spherical valve member wherein fluid flow in either direction may be contained.

* * * * *